(12) United States Patent
Hood (10) Patent No.: US 9,525,185 B2
(45) Date of Patent: Dec. 20, 2016

(54) CURRENT COLLECTOR COMPONENT FOR A FUEL CELL

(71) Applicant: Intelligent Energy Limited, Loughborough (GB)

(72) Inventor: Peter David Hood, Loughborough (GB)

(73) Assignee: Intelligent Energy Limited, Loughborough (GB)

(*) Notice: Subject to any disclaimer, the term of this patent is extended or adjusted under 35 U.S.C. 154(b) by 131 days.

(21) Appl. No.: 14/397,807

(22) PCT Filed: Apr. 24, 2013

(86) PCT No.: PCT/GB2013/051042
§ 371 (c)(1),
(2) Date: Oct. 29, 2014

(87) PCT Pub. No.: WO2013/164573
PCT Pub. Date: Nov. 7, 2013

(65) Prior Publication Data
US 2015/0180056 A1    Jun. 25, 2015

(30) Foreign Application Priority Data
May 1, 2012  (GB) .................................. 1207574.3

(51) Int. Cl.
*H01M 8/04* (2016.01)
*H01M 8/02* (2016.01)
(Continued)

(52) U.S. Cl.
CPC ....... *H01M 8/04074* (2013.01); *H01M 8/0204* (2013.01); *H01M 8/0228* (2013.01);
(Continued)

(58) Field of Classification Search
CPC  H01M 8/0204; H01M 8/0228; H01M 8/0267; H01M 8/04074; H01M 8/2465
See application file for complete search history.

(56) References Cited

U.S. PATENT DOCUMENTS 6,153,324 A    11/2000 Hiermaier et al.
2004/0247967 A1    12/2004 Resnick et al.
(Continued)

FOREIGN PATENT DOCUMENTS

WO    9620507    7/1996

OTHER PUBLICATIONS

International Preliminary Report on Patentability dated Nov. 13, 2014, issued in International patent application PCT/GB2013/051042.
(Continued)

*Primary Examiner* — Stewart Fraser
(74) *Attorney, Agent, or Firm* — Baker & Hostetler LLP (57) ABSTRACT

A current collector component (206) for a fuel cell. The current collector component (206) comprises a first electrically conductive plate (210) configured to form a wall of a fluid confinement volume of a fuel cell; and a second electrically conductive plate (212) in electrical contact with the first electrically conductive plate (210). The second electrically conductive plate (212) comprises an external electrical connection (208). The second electrically conductive plate (212) has a higher electrical conductivity than the first electrically conductive plate (210). The first electrically conductive plate (210) has a higher resistance to corrosion than the second electrically conductive plate (212).

10 Claims, 5 Drawing Sheets

(51) Int. Cl.
    *H01M 8/24*    (2016.01)
    *H01M 8/10*    (2016.01)
(52) U.S. Cl.
    CPC ....... *H01M 8/0267* (2013.01); *H01M 8/0297* (2013.01); *H01M 8/2465* (2013.01); *H01M 8/0206* (2013.01); *H01M 8/0213* (2013.01); *H01M 8/04037* (2013.01); *H01M 2008/1095* (2013.01); *H01M 2300/0082* (2013.01); *Y02E 60/50* (2013.01)

(56) References Cited

U.S. PATENT DOCUMENTS

| | | | |
|---|---|---|---|
| 2004/0253505 A1 | 12/2004 | Blunk et al. | |
| 2007/0231668 A1* | 10/2007 | Chang | H01M 8/0213 429/483 |
| 2010/0040923 A1 | 2/2010 | Kato | |
| 2010/0124683 A1 | 5/2010 | Carlstrom et al. | |
| 2010/0227245 A1* | 9/2010 | Yamada | H01M 8/0228 429/479 |
| 2010/0261079 A1* | 10/2010 | Kells | H01M 8/04037 429/429 |

OTHER PUBLICATIONS

United Kingdom Search Report dated Nov. 28, 2012, issued in United Kingdom patent application GB1207574.3.
United Kingdom Search Report dated Jul. 27, 2012, issued in United Kingdom patent application GB1207574.3.
International Search Report and Written Opinion dated Oct. 2, 2013, issued in International Patent Application PCT/GB2013/051042.

* cited by examiner

CURRENT COLLECTOR COMPONENT FOR A FUEL CELL

This Patent Application claims priority to International Patent Application PCT/GB2013/051042, filed Apr. 24, 2013, and United Kingdom Patent Application GB1207574.3, filed May 1, 2012, the contents of which are incorporated by this reference as if fully set forth herein in their entirety.

The present disclosure relates to the field of current collector components for fuel cells.

Conventional electrochemical fuel cells convert fuel and oxidant, generally both in the form of gaseous streams, into electrical energy and a reaction product. A common type of electrochemical fuel cell for reacting hydrogen and oxygen comprises a polymeric ion (proton) transfer membrane, with fuel and air being passed over respective sides of the membrane. Protons (i.e. hydrogen ions) are conducted through the membrane, balanced by electrons conducted through a circuit connecting the anode and cathode of the fuel cell. To increase the available voltage, a stack may be formed comprising a number of such membranes arranged with separate anode and cathode fluid flow paths. Such a stack is typically in the form of a block comprising numerous individual fuel cell plates held together by end plates at either end of the stack.

According to a first aspect of the invention, there is provided a current collector component for a fuel cell, the current collector component comprising:
  a first electrically conductive plate configured to form a wall of a fluid confinement volume of a fuel cell;
  a second electrically conductive plate in electrical contact with the first electrically conductive plate, wherein the second electrically conductive plate comprises an external electrical connection;
  wherein the second electrically conductive plate has a higher electrical conductivity than the first electrically conductive plate and the first electrically conductive plate has a higher resistance to corrosion than the second electrically conductive plate.

Such a current collector component can benefit from the high conductivity of the first electrically conductive plate without restricting the choice of material to one that has sufficient resistance to corrosion, which is provided by the second electrically conductive plate. In this way, the thermal lag of the current collector component and the weight of the current collector component can be reduced when compared with the prior art.

The planes of the first electrically conductive plate and the second electrically conductive plate may be parallel and adjacent. The current collector component may be provided as a unitary structure.

The current collector component may further comprise an integrated heater plate configured to heat the second electrically conductive plate. The heater plate may be in direct thermal contact with the second electrically conductive plate. The heater plate can enable the first and last fuel cells in the stack to be heated, thereby providing a more uniform heat profile across individual fuel cells in a fuel cell stack.

The current collector component may further comprise a thermal barrier layer located over the heater plate. The thermal barrier may be configured to thermally isolate the heater plate from an end plate assembly of a fuel cell stack. Therefore, the thermal barrier can reduce the likelihood that any external components, including the end plate assemblies, influence the temperature (performance) and transient response of the first and last cell, which would be the case if they were allowed to assume the bipolar plate temperatures.

The thermal barrier may be an overmoulding, which can seal the heater plate and second electrically conductive plate, except at the external electrical connection of the second electrically conductive plate and an electrical connection for the heater plate.

One or both external electrical connections of the second electrically conductive plate and the heater plate may be exposed for electrical connection, for example at an edge or face of the current collector component. One or both of the electrical connections of the second electrically conductive plate and the heater plate may extend to or from an external face/edge of the current collector component/fuel cell stack. In this way, the necessary electrical connections to the second electrically conductive plate and/or the heater plate can be conveniently provided.

The first electrically conductive plate may be configured to function as an electrode plate of a fuel cell. The first electrically conductive plate may be configured to be adjacent to a fuel cell membrane/fluid diffusion layer in a fuel cell stack. The first electrically conductive plate may be configured to abut a fluid diffusion layer.

The second electrically conductive plate may be isolated from the fluid confinement volume. Therefore, the requirements of the second electrically conductive plate in terms of resistance to corrosion are not as significant as the requirements of the first electrically conductive plate.

The first electrically conductive plate may comprise one or more fluid flow channels.

The fluid confinement volume may be defined/bounded by the first electrically conductive plate, a gasket and a membrane electrode assembly.

There may be provided a current collector component for a fuel cell, the current collector component comprising:
  an electrically conductive plate configured to form a wall of a fluid confinement volume of a fuel cell;
  a heater plate configured to heat the electrically conductive plate; and
  a thermal barrier located over the heater plate;
wherein the current collector component is a unitary structure.

Integrating the heater plate into such a unitary structure is advantageous because it provides a single component that can maintain a suitably uniform temperature profile across the fuel cells in a fuel cell stack in which it can be incorporated without unduly heating an external face of the fuel cell stack. Also, the unitary structure can provide environmental protection for the heater plate, for example protection from water splashes and/or general damp. The heater plate may comprise individual resistance wires or a heater mesh/matrix. Parallel and flatness accuracy of the electrically conductive plate (which may be referred to as a current collector plate) can be maintained as any irregularity in the shape of the heater plate can be accommodated by encapsulating it between the electrically conducive plate and the thermal barrier. That is, the irregular shape of the heater plate is not presented as an external surface of the current collector component. Therefore, a heater plate with an uneven surface (for example, one that is made from a woven material) can be used. Furthermore, providing a complete containment/encapsulation of the heater plate within the insulating properties of the thermal barrier can reduce parasitic losses.

There may be provided a fuel cell comprising a plurality of any fuel cell plate assemblies as disclosed herein. There may be provided a fuel cell comprising a current collector component as disclosed herein.

There may be provided a fuel cell stack comprising a plurality of any fuel cell plate assemblies as disclosed herein. There may be provided a fuel cell stack comprising a current collector component as disclosed herein.

The fuel cell stack may comprise:
an anode current collector plate comprising any current collector component disclosed herein; and
a cathode current collector plate comprising any current collector component disclosed herein;
wherein the first electrically conductive plate of the cathode current collector plate has a higher resistance to corrosion than the first electrically conductive plate of the anode current collector plate.

A description is now given, by way of example only, with reference to the accompanying drawings, in which.

One or more embodiments disclosed herein relate to a current collector component for a fuel cell comprising two electrically conductive plates in electrical contact with each other. A first electrically conductive plate forms a wall of a fluid confinement volume of a fuel cell and a second electrically conductive plate comprises an external electrical connection. The second electrically conductive plate has a higher electrical conductivity than the first electrically conductive plate and the first electrically conductive plate has a higher resistance to corrosion than the second electrically conductive plate. Such a current collector component can benefit from the high conductivity of the first electrically conductive plate without restricting the choice of material to one that has sufficient resistance to corrosion, which is provided by the second electrically conductive plate.

Figure 1:
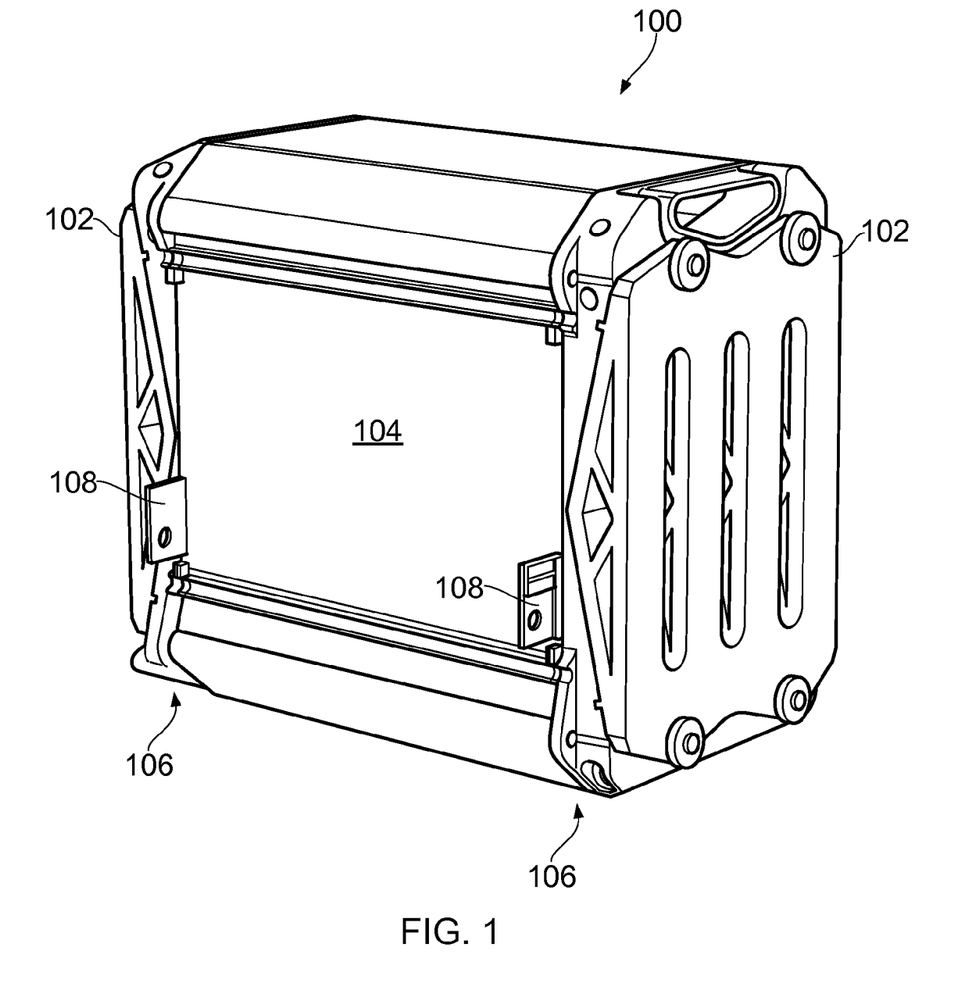
FIG. 1 shows a fuel cell stack that includes two current collector components according to an embodiment of the invention.

FIG. 1 shows a fuel cell stack 100 that includes two current collector components 106 according to an embodiment of the invention. The fuel cell stack 100 has a plurality of fuel cells 104 with an end plate assembly 102 at each end. The fuel cells 104 comprise a bipolar electrode plate in some examples. Adjacent to each end plate assembly 102 is a current collector component 106 according to an embodiment of the invention. Each current collector component 106 provides an external electrical connection, in this example a tab 108, for including the fuel cell stack 100 in an electrical circuit.

Figure 2:
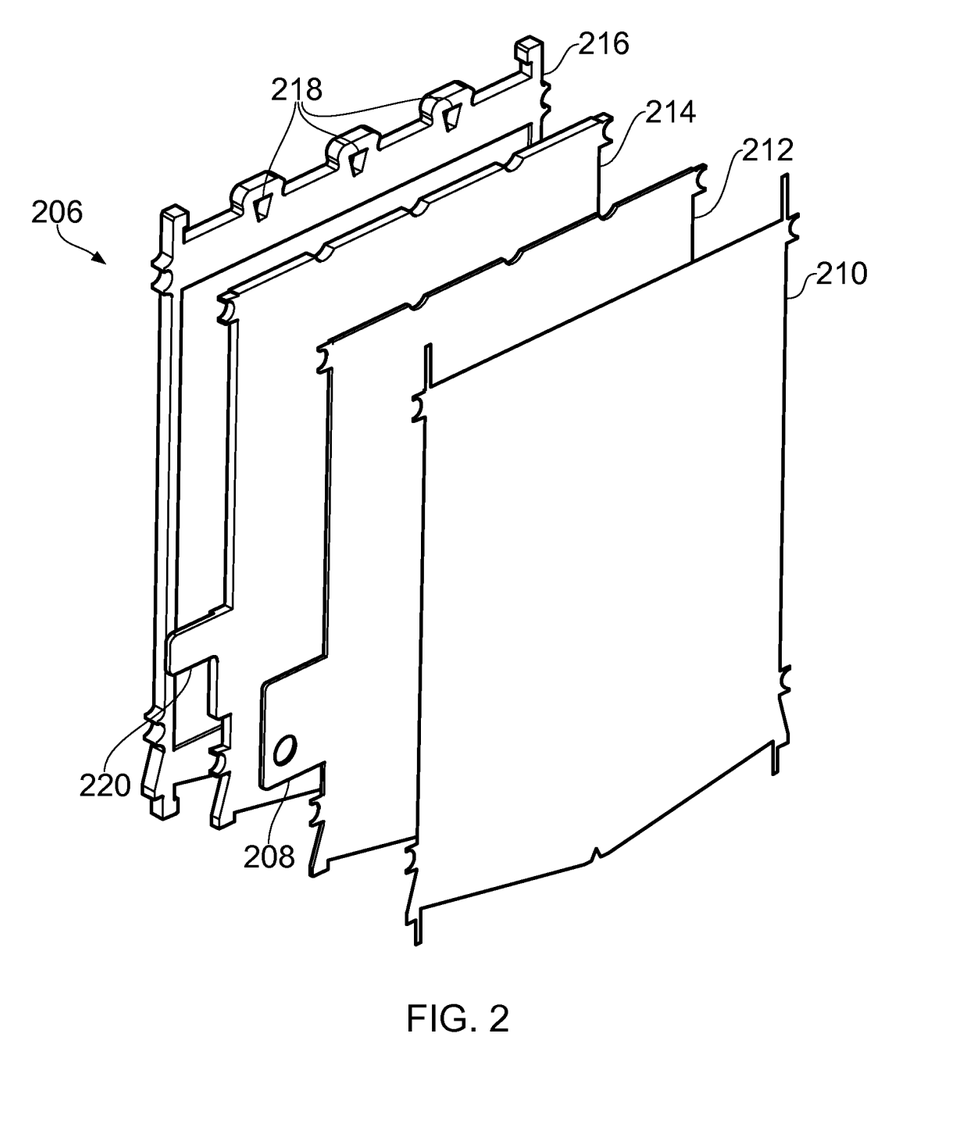
FIG. 2 shows an exploded view from the front of a current collector component according to an embodiment of the invention.

FIG. 2 shows an exploded view from the front of a current collector component 206 according to an embodiment of the invention. In this example, the current collector component 206 comprises four layers that can be integrated together to provide the current collector component 206 as a unitary component/structure. The four layers are: a first electrically conductive plate 210; a second electrically conductive plate 212; a heater plate 214 and a thermal barrier 216.

When the current collector component 206 is located in a fuel cell stack, the thermal barrier 216 is nearest the adjacent end plate assembly. The first and second electrically conductive plates 210, 212 together provide an electrode plate of an end fuel cell in the stack. The first electrically conductive plate 210 is adjacent to, and may abut, a fuel cell membrane/fluid diffusion layer when the fuel cell stack is assembled. It will be appreciated that the first and second electrically conductive plates 210, 212 at one end of the fuel cell stack together define an anode plate, and the first and second electrically conductive plates 210, 212 at the other end of the fuel cell stack together define a cathode plate.

The current collector components 206 described herein can be provided at both ends of a fuel cell stack, or only one end of a fuel cell stack. The current collector components 206 described herein would provide a reducing environment at an anode side of a fuel cell and would provide an oxidizing environment at a cathode side of a fuel cell. In some examples a first electrically conductive plate 210 that functions as a cathode current collector may be made from a higher grade of stainless steel than an anode current collector, assuming that the associated oxide layer thicknesses with various materials was electrically acceptable. That is, a fuel cell stack may be provided that has an anode current collector component and a cathode collector component, in which the first electrically conductive plate of the cathode collector component has a higher resistance to corrosion than the first electrically conductive plate of the anode collector component.

The first electrically conductive plate 210 forms a wall of a fluid confinement volume of the end fuel cell. The fluid confinement volume is described in more detail below with reference to FIG. 4. The first electrically conductive plate 210 has a higher resistance to corrosion than the second electrically conductive plate 212. The first electrically conductive plate 210 may be more electrochemically passive than the second electrically conductive plate 212. This is advantageous because the first electrically conductive plate 210 is in contact with fluid in the fluid confinement volume and the second electrically conductive plate 212 is shielded/isolated from the fluid confinement volume by the first electrically conductive plate 210. Therefore, the first electrically conductive plate 210 is more susceptible to corrosion by fluid in the fluid confinement volume.

Corrosion can be considered as the disintegration of an engineered material into its constituent atoms due to chemical reactions within its surroundings, which can be caused by oxidisation, but can also be caused by other types of chemical reactions.

Non-limiting examples for materials of the first conductive plate 210 include: a very light gauge stainless steel foil, for example with a thickness of 0.10 mm or less; and titanium.

In some examples, a single electrically conductive plate can be used. That is, the separate electrically conductive plates 210, 2112 shown in FIG. 2 may not be necessary. In this instance, the electrically conductive plate may be made from a carbon or a carbon composite. The thickness of such a layer may be about 1 to 2 mm.

The first electrically conductive plate 210 is in electrical contact with the second electrically conductive plate 212. For example, the two electrically conductive plates can be float soldered, bonded, rolled (such that the materials merge due to molecular transfer between the materials), joined, or dry faced (not attached) to one another dependent on the suitability of the materials for combination with one another.

The second electrically conductive plate 212 has a higher electrical conductivity than the first electrically conductive plate 210. The material of the second electrically conductive plate 212 is selected with a view to the second electrically conductive plate 212 providing the majority of the current carrying requirement of the current collector component 206. That is, the material of the second electrically conductive plate 212 can be selected to provide good electrical conductance without being restricted to a material that has good resistance to corrosion.

Non-limiting examples for materials of the second conductive plate 212 include: aluminium alloy, copper, carbon composite or a similar electrically conductive material.

The second electrically conductive plate 212 comprises an external electrical connection 208, which in this example is a tab, that can be connected to an electrical circuit that can draw current from the fuel cell stack.

The first electrically conductive plate 210 and the second electrically conductive plate can be referred to together as a bimetallic insert/plate.

The heater plate 214 is next to the second electrically conductive plate 212, on the opposite side to the first electrically conductive plate 210. The heater plate 214 is used to enable the first and final fuel cells in the stack (in the case where a current collector component 206 is included at both ends of the stack) to operate uniformly with the other (internal) fuel cells in the fuel cell stack and to allow cold starts to be accomplished efficiently.

The heater plate 214 may be in direct thermal contact with the second electrically conductive plate 212. The heater plate 214 may be implemented as a resistance heater, which could comprise separate wires (that are electrically insulated from the second electrically conductive plate 212) or a rigid/flexible printed circuit board (PCB) attached to a substrate. The heater plate 214 has an electrical connection, which in this example is a tab 220, that extends from the side of the heater plate 214. The tab 220 is used to provide power to the heater plate 214 and is described in more detail with reference to FIG. 3.

When the current collector component 206 is assembled, the heater plate 214 can be bonded to the second electrically conductive plate 212, for example by adhesive.

Using two electrically conductive plates 210, 212 made from different materials is advantageous over using a single thick gauge stainless steel electrically conductive plate. When using only a stainless steel electrically conductive layer (due to its good resistance to corrosion) a thick layer is required to handle the large currents generated, which results in a heavy fuel cell stack and also requires a separate high power heater. A high power heater is required to enable the initial and final fuel cells in the stack to operate uniformly without excessive thermal lag (adjacent to the mass of the current collector component 206). It may not be possible to integrate such a high power heater into a unitary component with a thick gauge stainless steel electrically conductive plate.

The thermal barrier 216 is located next to the heater plate 214, on the opposite side to the second electrically conductive plate 212. The thermal barrier 216 in this example is an over-moulding made from a rubber material. The purpose of the thermal barrier 216 is to thermally isolate the heater plate 214 and electrically conductive plates 210, 212 from the end plate of the fuel cell stack, thereby impeding heat transfer from the heater plate 214 to an end plate assembly. The thickness of the thermal barrier 216 can be set such that sufficient thermal isolation is provided by the thermal barrier 216. Alternatively, a thinner thermal barrier 216 can be used in combination with an additional layer (not shown) that has good thermal insulating properties.

The thermal barrier 216 is located over the heater plate 214 when the heater plate 214 is integrated with the second conductive plate 212. The thermal barrier 216 seals the heater plate 214 and the second conductive plate 212 when the current collector component 206 is assembled, except at the external electrical connection 208 of the second electrically conductive plate 212 and at the tab 220 of the heater plate 214. The external electrical connection 208 and the tab 220 are exposed at the surface of the fuel cell stack when it is assembled to allow the external connections for current correction from the fuel cell stack, and for supplying power to the heater plate. Therefore, the external electrical connection 208 and/or the tab 220 can extend to or from an external face of the current collector component 206/fuel cell stack.

The thermal barrier 216 in this example has three ports 218 for either providing fluids to the fuel cells or delivering fluids away from the fuel cells. Use of similar ports in the fuel cells is known in the art and therefore the ports 218 in the thermal barrier 216 will not be described in detail here.

The profile of the thermal barrier 216, port geometries and thickness of the current collector component 206 can be made to comply and interface between the first (bipolar) plate of the fuel cell stack and the end plate.

When the current collector component 206 is assembled, the planes of each of the layers 210, 212, 214, 216 are parallel and adjacent.

In some examples, the current collector component 206 can be provided without one or more of the layers shown in FIG. 2. For instance, a current collector component can be provided that only consists of the first electrically conductive plate 210 and the second electrically conductive plate 212, thereby still providing the advantages that arise from using an electrically conductive plate 210 with a high resistance to corrosion for forming the wall of the fluid confinement volume and a separate electrically conductive plate 212 that has good electrical conductance. As another example, a current collector component can be provided that consists of one electrically conductive plate, the heater plate 214 and the thermal barrier 216, thereby still providing the advantages that arise from integrating the heater for the electrically conductive plate, into the current collector component 206.

Figure 3:
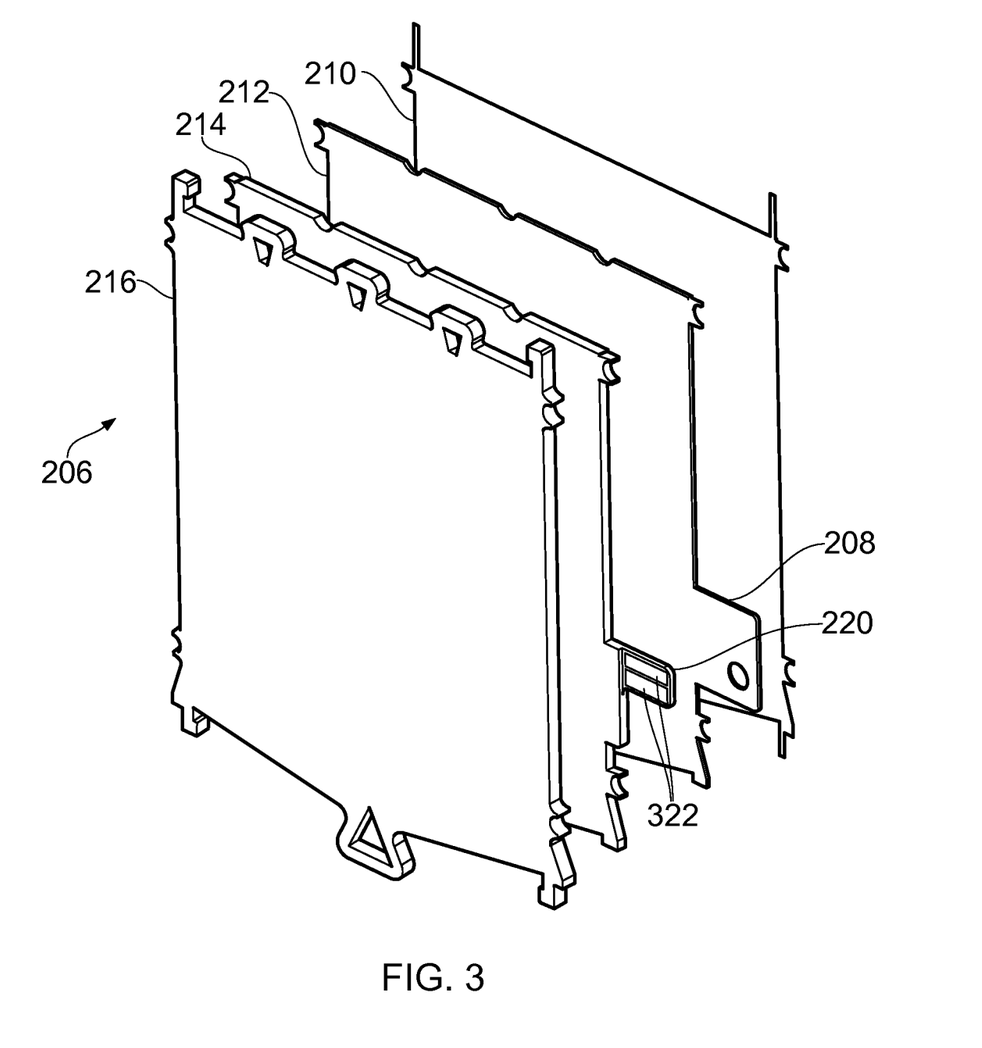
FIG. 3 shows an exploded view from the back of the current collector component of FIG. 2.
Figure 5:
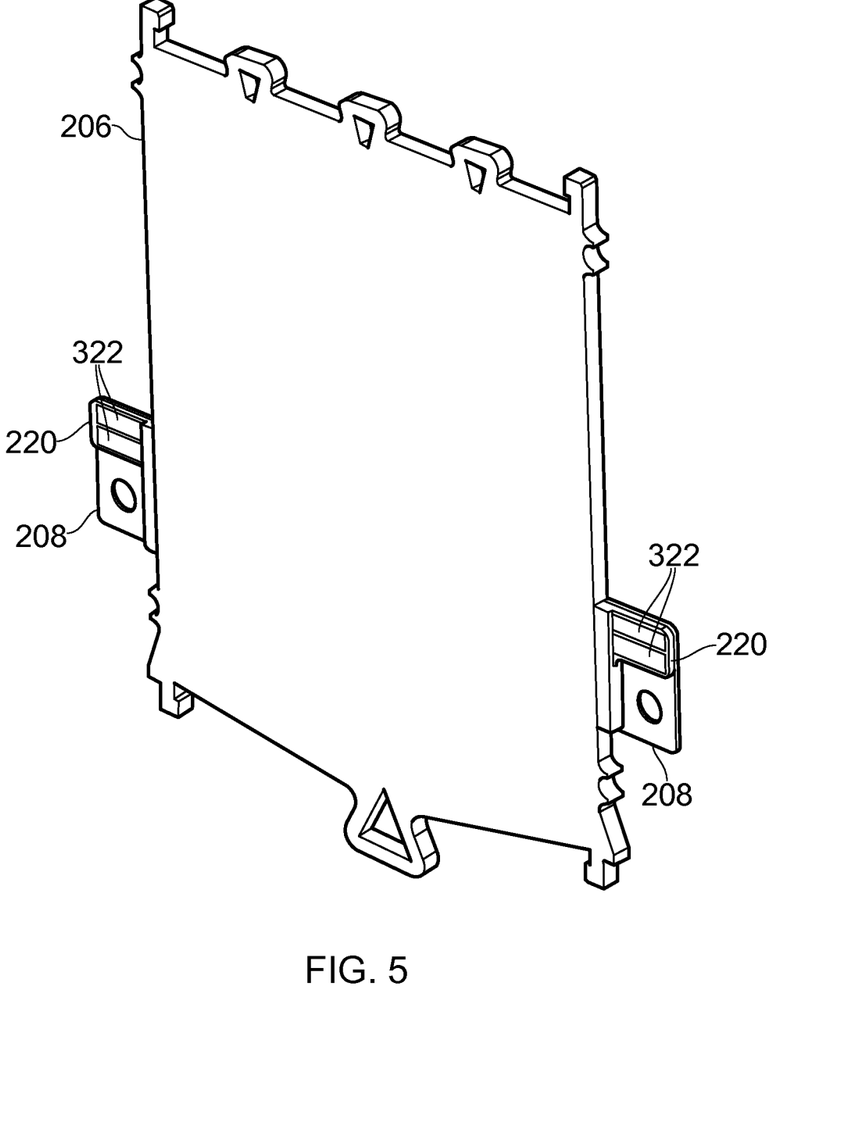
FIG. 5 shows a back view of the current collector component of FIG. 4.

FIG. 3 shows an exploded view from the back of the current collector component 206 of FIG. 2. Shown in FIG. 3 is the tab 220 extending from the side of the heater plate 214. The tab has two electrical connections 322 for providing power to the heater plate 214. The tab 220 of the heater plate 214 is aligned with the external electrical connection 208 of the second electrically conductive plate 212 when the current collector plate is assembled (as shown in FIG. 5). This can be convenient as the electrical connections to the fuel cell stack are close together.

Figure 4:
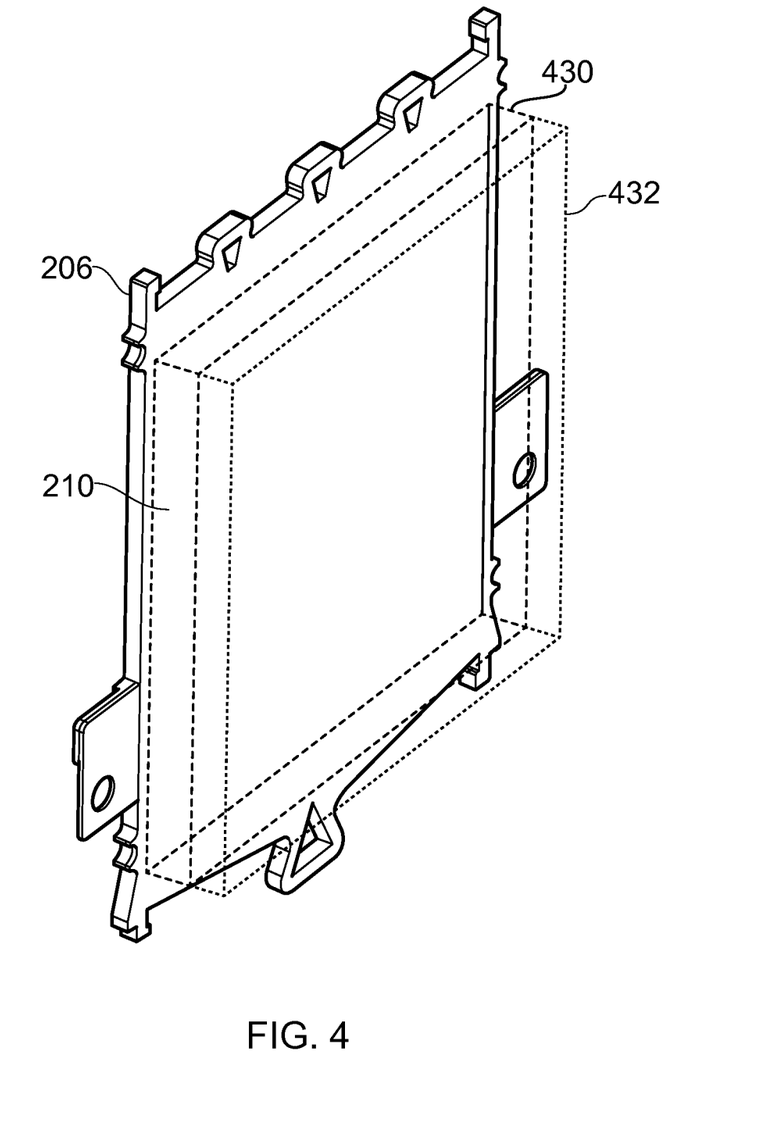
FIG. 4 shows a front view of the current collector component of FIG. 2 in an assembled state.

FIG. 4 shows a front view of the current collector component 206 of FIG. 2 in an assembled state as a unitary structure. Also shown in FIG. 4, in dashed lines, is a fluid confinement volume 430 of a fuel cell that is defined when the current collector component 206 is located in a fuel cell stack. A fluid diffusion layer, which will be referred to as a gas diffusion layer (GDL), is typically located in the fluid confinement volume 430. The dimensions of the fluid confinement volume 430 have been exaggerated for ease of illustration.

If the first conductive layer defines an anode plate, then the fluid that is provided to the fluid confinement volume 430 is typically hydrogen fuel. If the first conductive layer defines a cathode plate, then the fluid that is provided to the fluid confinement volume 430 is typically oxidant.

It can be seen that the first electrically conductive plate 210 forms a wall of the fluid confinement volume 430. The fluid confinement volume 430 is bounded by a membrane electrode assembly (MEA) 432 on the opposite side of the fluid confinement volume 430 to the first electrically conductive plate 210. The fluid confinement volume 430 may be also bounded by a gasket or other seal (not shown in the figures) around the four remaining sides of the fluid confinement volume 430.

The first electrically conductive plate 210 may comprise one or more fluid flow channels in its surface that extend the volume of the fluid confinement volume. The GDL does not entirely occupy the volume defined by the fluid flow channels. In this way, the fluid flow channels can enable fluid to more easily pass over the surface of the GDL such that the fluid can evenly spread out over the surface of the MEA 432.

In examples where fluid flow channels are not provided in the first electrically conductive plate 210, then it may not be necessary to protect the current collector component 206 from corrosion. This is because the current collector component is protected from the fuel cell environment and therefore the conductive plate will be exposed to less, if any, corrosive fluids than would be the case if fluid flow channels were present. In such examples, the first electrically conductive plate 210 may be omitted from the current collector component 206. The remaining electrically conductive plate 212 may be made from aluminium alloy or copper, for example.

FIG. 5 shows a back view of the current collector component 206 of FIG. 4. FIG. 5 shows that the electrical connections 322 for the heater plate are next to the external electrical connections 208 of the second electrically conductive plate. In this example, the external electrical connection tabs 208 have a hole in them to assist in fixing an electrical connector to the tabs 208.

Embodiments of the invention can be considered as a fuel cell current collector component that comprises an overmoulded bimetallic insert that satisfies the corrosion resistance, current conducting capacity, gas containment/conduction, thermal insulation and heating requirements in a lightweight package.

One or more of the following benefits may be provided by an embodiment of the present invention:

The greatly improved current carrying capability of aluminium, copper or carbon composite compared to stainless steel allows the mass of the current collector component to be significantly reduced. This, in turn, allows the thermal response of the current collector to be a closer match to an adjacent bipolar plate of a fuel cell with the minimum of electrical heating, thereby promoting the uniform dynamic response of the complete stack assembly.

Smaller heaters reduce the parasitic losses. The parasitic losses can be considered as the net output from the entire system deducted from the stack gross output. Therefore, the parasitic losses take into account the power used by heaters, pumps, blowers, etc.

Robust (integrated component) sub-assembly.

Overall reduced mass.

Reduction in gas seal interfaces due to the integration of the heater plate and current collector with the thermal barrier, which includes the moulded gas port ways. It can be advantageous to keep these sealing surfaces to a minimum to reduce the risk of leaks.

Improved cold start capability.

Low overall resistance of the bimetallic electrically conductive plate promotes uniform current collector temperature.

Smaller external electrical connection tabs (which may be referred to as take-off tabs) due to the fact that the resistance of the second electrically conductive is less than the first electrically conductive plate, which may be stainless steel.

Improved tab to connector interface due to the smaller surface area (buzz bar/connector) that is required to remove the current.

Integrated heater element and optional removable covers (such as gaiters) for the tabs 208 can shroud the take-off tabs and current cables to allow IP64 or similar splash proof certification.

The invention claimed is:

1. A current collector component for a fuel cell, the current collector component comprising:
an electrically conductive plate configured to form a wall of a fluid confinement volume of a fuel cell;
a heater plate configured to heat the electrically conductive plate; and
a thermal barrier located over the heater plate;
wherein the current collector component is a unitary structure.

2. The current collector component of claim 1, wherein the heater plate is in direct thermal contact with the electrically conductive plate.

3. The current collector component of claim 2, wherein the thermal barrier is configured to thermally isolate the heater plate from an end plate assembly of a fuel cell stack.

4. The current collector component of claim 1, wherein the thermal barrier is configured to thermally isolate the heater plate from an end plate assembly of a fuel cell stack.

5. A current collector component for a fuel cell, the current collector component comprising:
an electrically conductive plate configured to form a wall of a fluid confinement volume of a fuel cell;
a heater plate configured to heat the electrically conductive plate;
a thermal barrier located over the heater plate;
wherein the current collector component is a unitary structure; and,
wherein the thermal barrier is an overmolding that seals the heater plate and the electrically conductive plate, except at an external electrical connection of the electrically conductive plate and an electrical connection for the heater plate.

6. The current collector component of claim 5, wherein the external electrical connection is exposed for electrical connection.

7. The current collector component of claim 6, wherein the external electrical connection one of extends from an external edge of the current collector component and extends to an external edge of the current collector component.

8. A current collector component for a fuel cell, the current collector component comprising:
an electrically conductive plate configured to form a wall of a fluid confinement volume of a fuel cell;
a heater plate configured to heat the electrically conductive plate;
a thermal barrier located over the heater plate;
wherein the current collector component is a unitary structure;
wherein the heater plate is in direct thermal contact with the electrically conductive plate; and,
wherein the thermal barrier is an overmolding that seals the heater plate and the electrically conductive plate, except at an external electrical connection of the electrically conductive plate and an electrical connection for the heater plate.

9. A current collector component for a fuel cell, the current collector component comprising:
   an electrically conductive plate configured to form a wall of a fluid confinement volume of a fuel cell;
   a heater plate configured to heat the electrically conductive plate;
   a thermal barrier located over the heater plate;
wherein the current collector component is a unitary structure;
wherein the heater plate is in direct thermal contact with the electrically conductive plate; and,
wherein the thermal barrier is configured to thermally isolate the heater plate from an end plate assembly of a fuel cell stack; and,
   wherein the thermal barrier is an overmolding that seals the heater plate and the electrically conductive plate, except at an external electrical connection of the electrically conductive plate and an electrical connection for the heater plate.

10. A current collector component for a fuel cell, the current collector component comprising:
   a first electrically conductive plate configured to form a wall of a fluid confinement volume of a fuel cell;
   a second electrically conductive plate in electrical contact with the first electrically conductive plate, wherein the second electrically conductive plate comprises an external electrical connection;
   an integrated heater plate configured to heat the second electrically conductive plate;
   a thermal barrier layer over the heater plate;
   wherein the thermal barrier is configured to thermally isolate the heater plate from an end plate assembly of a fuel cell stack;
   wherein the thermal barrier is an overmolding that seals the heater plate and second electrically conductive plate, except at the external electrical connection of the second electrically conductive plate and an electrical connection for the heater plate; and,
   wherein the second electrically conductive plate has a higher electrical conductivity than the first electrically conductive plate and the first electrically conductive plate has a higher resistance to corrosion than the second electrically conductive plate.

* * * * *